M. H. FARLEY.
AUTOMATIC CIRCUIT CLOSER FOR ELECTRIC HEATERS.
APPLICATION FILED MAR. 23, 1916.
1,228,195.
Patented May 29, 1917.
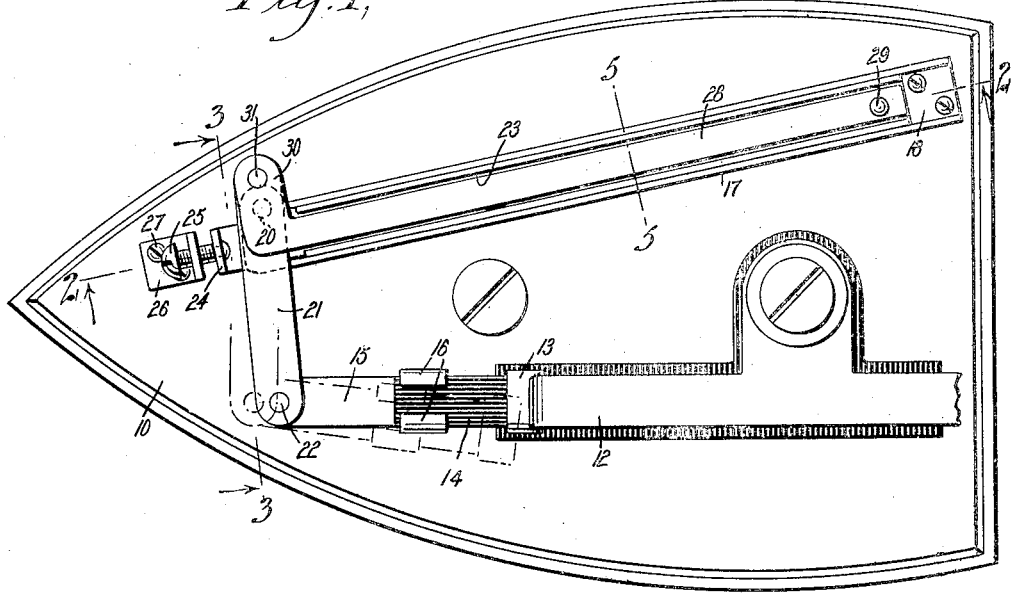
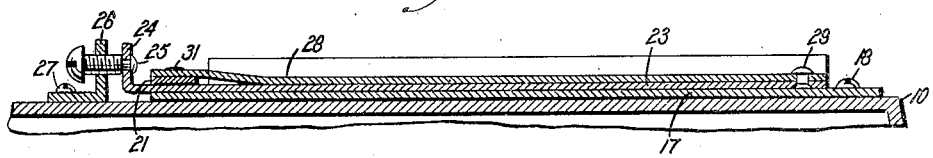
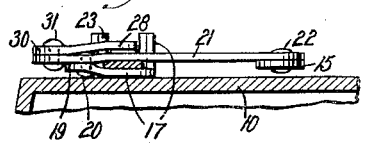
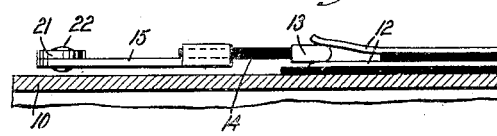
WITNESSES
Edw. Thorpe
Geo. H. Beelen
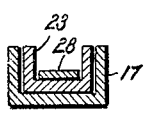
INVENTOR
M. H. Farley,
BY Munn & Co
ATTORNEYS

UNITED STATES PATENT OFFICE.

MICHAEL HOUGH FARLEY, OF SEATTLE, WASHINGTON, ASSIGNOR OF ONE-HALF TO ARTHUR W. KAH, OF SEATTLE, WASHINGTON.

AUTOMATIC CIRCUIT-CLOSER FOR ELECTRIC HEATERS.

1,228,195.

Specification of Letters Patent. Patented May 29, 1917.

Application filed March 23, 1916. Serial No. 86,135.

*To all whom it may concern:*

Be it known that I, MICHAEL H. FARLEY, a citizen of the United States, and a resident of Seattle, in the county of King and State of Washington, have invented a new and Improved Automatic Circuit-Closer for Electric Heaters, of which the following is a full, clear, and exact description.

This invention relates to automatic circuit breakers or closers and has particular reference to such devices employed in connection with electric heaters.

More definitely stated, one of the principal objects of the invention is to provide an automatic thermostatic switch or controller for use in connection with an electric sad iron, the same being adapted not only to break the circuit when the iron attains a certain predetermined degree of heat and to again close the circuit when the temperature of the iron becomes reduced, but is of such a nature as to be easily and delicately adjusted so as to vary that degree of heat, which makes the device adapted for higher or lower temperatures according to the desire of the operator.

With the foregoing and other objects in view, the invention consists in the arrangement and combination of parts hereinafter described and claimed, and while the invention is not restricted to the exact details of construction disclosed herein, still for the purpose of illustrating a practical embodiment thereof reference is had to the accompanying drawings, in which like reference characters designate the same parts in the several views, and in which—

Figure 1 is a plan view of an electric sad iron with the handle and cap removed, and indicating in full lines the position of the movable switch to close the circuit, and in dotted lines the changed position when the circuit is broken;

Fig. 2 is a vertical longitudinal section of the main parts of the thermostat on the line 2—2 of Fig. 1;

Fig. 3 is a vertical transverse section on the line 3—3 of Fig. 1;

Fig. 4 is a diagram of the resistance coils and wiring in connection with a side elevation of the contact springs and bridge piece operated by the thermostat; and Fig. 5 is a transverse sectional detail on the line 5—5 of Fig. 1.

From what has been stated above, it will be understood that while I show a sad iron as an example of the utility of this device, the circuit breaker is adapted for use in other forms or types of heaters, such, for example, as bread toasters, car heaters, warming pads, etc. The illustration given, however, is well adapted to indicate how the invention is particularly adapted for use in comparatively small or compendious inclosures.

Referring now more particularly to the drawings, I show at 10 a sad iron or base upon which the improved devices are secured. On or within this base is arranged any suitable number or type of resistance coils 11, the circuit through which includes a pair of spaced contact springs 12 adapted to be connected or bridged by a switch point 13 secured by an arm of insulation 14 to a link 15, the connection being made through a pair of clamps 16 or their equivalent, secured to the free end of the insulation.

The principal improvement lies in the thermostatic means for controlling the action or position of the contact piece 13. The primary element of the thermostat comprises a channel member 17 anchored rigidly at one end at 18 to the base 10. This point of connection 18 is adjacent one end of the base, and thence the channel member 17 extends toward the opposite end of the base, or, in other words, the thermostatic member 17 is practically as long as the dimensions of the supporting structure will warrant or permit. The forward end of the channel member 17 is provided with a laterally projecting lug 19 through which a pivot 20 connects the same to a lever 21 having longer and shorter arms, the longer arm being rigidly connected at the point 22 to the link 15 above described.

The second main portion of the thermostat comprises another expansion member 23 also shown in the form of a channel member and housed within the channel of the first expansion member 17, making a compact construction and one in which the parts mutually contribute to keep one another in place. The front end of the second expansion member 23 is provided with an upwardly projecting lug 24 in which an adjustment screw 25 is swiveled, the screw being tapped through a bracket 26 fixed or anchored to the front end of the base at 27. For practical purposes this bracket and screw constitute an anchorage for the second expansion member. The rear or opposite end, however, of this member is free to move independently of and within the first expansion member 17.

The third member of the thermostat is indicated at 28, the same being a draft member of substantially the same length as the second expansion member and lying along the channel thereof. The rear ends of the second expansion member 23 and the draft member 28 are secured rigidly together at 29. The front end, however, of the draft member is adapted for movement independently of the adjacent end of the expansion member in which it is mounted. Said front end of the draft member is provided with a laterally projecting lug 30 extending over and laterally beyond the lug 19 of the first expansion member. A pivot 31 connects this outer end of the lug 30 with the shorter arm of the lever 21, as shown best in Fig. 3. The two expansion members may be made of any suitable metal having a high co-efficient of expansion, but the draft member is preferably made of a metal having a low co-efficient of expansion. The arrangement of these parts is such that though the space in which to operate is extremely limited, I am able to secure a degree of expansion of the expansion members corresponding practically to a member of twice the length of either of them. In other words, by connecting the parts as indicated, I provide for the expansions of the members 17 and 23 to be added together through their respective ratios of longer and shorter arms to actuate the switch point 13.

As will be noted from Fig. 1, the relative positions of the pivots 20 and 31 with respect to the longitudinal axis of the thermostat determines the extent of oscillation of the point 22 at the end of the longer arm of the lever 21, and accordingly the position of the contact piece 13. More definitely stated, considering the anchorage point 18 of the primary expansion member as a starting point, the increase of heat in the device will cause the elongation of the member 17 with a corresponding movement of the pivot 20 toward the front end of the base or to the left in Fig. 1. This movement of the pivot 20 would tend to throw the point of connection 22 likewise toward the left. Likewise, considering the second expansion member 23 as having its front end 24 fixed with respect to the base, the same heat acting upon this member will cause the elongation thereof carrying the connecting point 29 toward the rear or toward the right in Fig. 1. Since, however, the draft member 28 has comparatively little expansibility when subjected to the same heat as the other members, the elongation or expansion of the intermediate member 23 will carry the point 31 toward the right in Fig. 1 an amount approximately equal to the expansion of the member 23. It follows, therefore, that with the point 20 moved to the left and the pivot point 31 moved to the right, the amount of elongation of the expansion members will be accumulative, and the same, augmented by the disparity in lengths of the two arms of the lever 21, will cause sufficient lineal movement of the contact piece 13 to throw it into or out of contact with the springs 20 during the reasonable variations in heat subjected to the thermostat.

The thread of the screw 25 being regarded as right handed, a rotation or adjustment of the screw in a right handed direction will cause the expansion member 23 and that member connected thereto to be forced rearwardly with the result that the tendency of the adjustment will be to withdraw the contact piece 13 from the springs. In other words, to adjust the device to break the circuit at a lower degree of heat, the screw is turned to the right, and if greater heat is required the adjustment screw will be turned to the left. The device is simple in construction, neat and compact in installation, of delicate adjustment, and yet safe and reliable in practical operation.

I claim:—

1. In a thermostatic circuit closer, the combination of relatively fixed and movable contact members, a lever having longer and shorter arms, the longer arm being connected to the movable contact member, a pair of expansion members arranged parallel to each other, one of said members being anchored at one end and the other member being anchored at its opposite end, and means to connect the otherwise free ends of the expansion members to said lever whereby the effect of the expansion of one member acting upon the lever will be added to that of the other expansion member.

2. In a thermostatic circuit closer, the combination with relatively fixed and movable contact members, of a thermostat connected to the movable member and comprising a lever, a pair of expansion members arranged and guided one within the other and of approximately the same length, means to fix one end of one member in stationary position, means to anchor the opposite end of the other member in position, the otherwise free end of one of the expansion members being pivoted to the lever, and a draft member extending from the otherwise free end of the other expansion member to a point of pivotal connection with said lever, the two pivotal connecting points between the lever and the two expansion members being movable relatively in opposite directions whereby the expansion of the two members is accumulative as made effective upon the movable contact member through said lever.

3. In a device of the character set forth, the combination of a pair of expansion members one arranged within the other, means to anchor opposite ends of these two members respectively in fixed position, a lever extending laterally with respect to the longitudinal axis of said expansion members, and means to connect the otherwise free ends of the expansion members respectively to independent points of said lever whereby the expansion of said expansion members tends to vary the angle between the lever and said axis.

4. In a device of the character set forth, the combination of an expansion member, means to anchor one end of this member in fixed position, a second expansion member housed within and movable lengthwise with respect to the axis of the first mentioned member, means to adjustably anchor the end of the second member remote from the anchorage point of the first member, a lever extending at an angle to the axis aforesaid, and independent and independently movable points of connection between said lever and the free ends of said expansion members.

MICHAEL HOUGH FARLEY.

Witnesses:
NELSON HUGHES,
H. J. WALLER.